Jan. 27, 1959 L. W. ROSE 2,870,563
BAIT ATTACHMENT DEVICES
Filed April 9, 1956
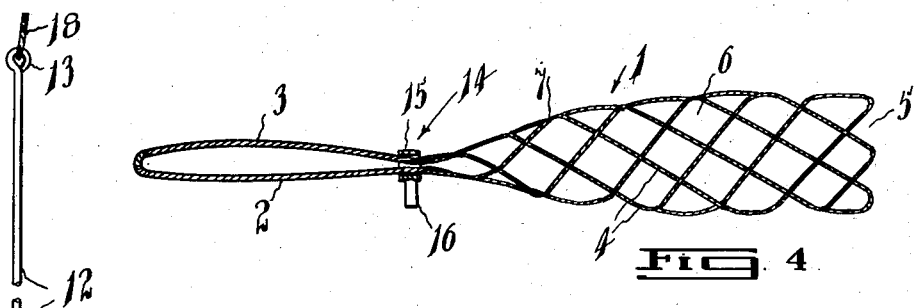
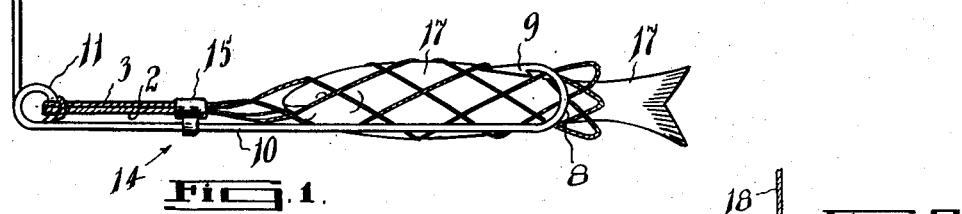
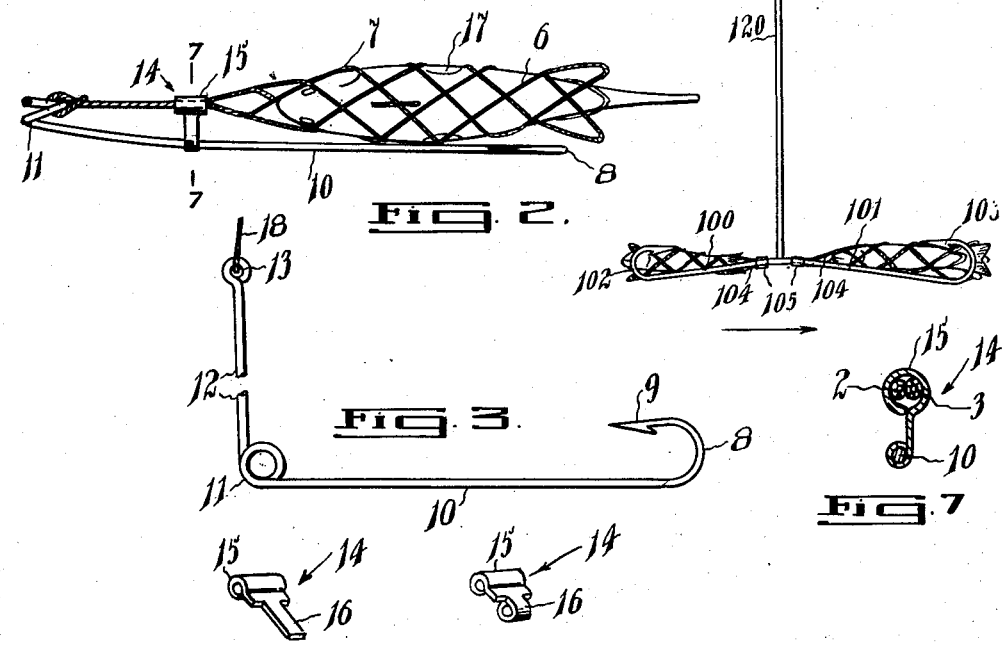
INVENTOR
LESLIE W. ROSE
By Frederick C. Bromley
ATTY.

United States Patent Office 2,870,563
Patented Jan. 27, 1959

2,870,563

BAIT ATTACHMENT DEVICES

Leslie W. Rose, Toronto, Ontario, Canada

Application April 9, 1956, Serial No. 577,161

1 Claim. (Cl. 43—41)

This invention relates to fishing lures and/or baits, and particularly to a live bait holder.

More particularly the invention is directed to lures of the kind which may be used in conjunction with live bait and especially with live fish bait.

The advantages attending the use by anglers of a living bait or lure are well known. A difficulty in realizing this advantage stems from the fact that live bait which are injured by being impaled for example upon a hook do not always remain alive long enough to accomplish the intended purpose of luring a game fish onto the hook.

Another problem attending the use of live bait has arisen due to the difficulty of providing a fastening for the bait which does not permit a crafty fish from removing the bait without becoming entangled firmly upon the angler's hook.

Realizing this difficulty prior art workers have proposed various arrangements for holding a live bait captive in a secured manner within a cage or container to which a hook is in some manner attached.

Prior art devices of this kind suffer from deficiencies. In some cases the enclosure is so opaque to the aura of the bait that it does not attract the game. In other cases the cage in which the bait is held is difficult to load, and in other cases again the bait cage is insecure so that the bait may escape or be taken by the game without penalty.

It is an object of this invention to provide a cage for holding a live bait at a suitable attitude in cooperation with a fish hook of such a nature that a live bait can be inserted therein quickly and with a minimum of effort and elapsed time.

Another object is to provide a cage for holding a live bait at a suitable attitude in cooperation with a fish hook, the construction being such that the bait is not injured by insertion in the cage and is not physically damaged by the cage during its imprisonment therein, at least until it has been taken by a piscatorial game.

A still further object is to provide a live bait arrangement of the kind discussed wherein the live bait cannot be removed by the intended game even should the latter escape being impaled upon the attendant hook.

It is also an object to provide an improved lure incorporating a secure live bait cage cooperating with a hook having a relatively long shank coupled thereto by a resilient joint, the long shank and the bill-shank being angularly disposed toward one another.

In order to achieve the objects above enumerated, I provide a live bait cage fashioned after the manner of the so-called "Chinese pull." In some other fields of endeavour a construction of this kind is sometimes called a "sock." Essentially the device comprises a number of strands of material interlaced to form an enclosure resembling a cage having a length substantially greater than a diameter. It usually terminates in a tail at one end where all the strands meet and are bound together; the other end or mouth is a sharply defined, usually circular opening. When an object enters the mouth of the cage the strands relax while movement of an article is inward toward the tail but when an attempt is made by the object to back out of the cage the strands pull taut and are urged to lessen the diameter of the cage so that the object is grasped firmly. It is almost impossible to separate the cage from a snugly fitting article by pulling upon the tail piece and a device of this type is often used to pull cables through conduits, to lift articles from the hold of a ship and the like. An article can be readily removed from a sock as soon as the strain upon the strands is relaxed but not otherwise.

In the construction of my invention I employ a sock of the type described comprising a cylindrical body portion, a tapered portion at one end of the body and terminating in a flexible wire pull, and at the other end of the body portion a mouth defined by re-tracing the strands forming the body enclosure. The body portion comprises the space enclosed by interlaced strands of a material. In a preferred construction I employ strands of hard drawn Phosphor bronze wires, each strand of the sock being comprised of a cable composed of about seven wires of approximately 0.005 inch diameter. The cable may be twisted or woven in character but should be flexible without being limp so that when the cables are interlaced to form the sock, the structure will hold a defined shape, firm but resilient. A very good form of sock is obtained by using eight strands interlaced.

The mean diameter of the body is selected in accordance with the type of bait to be used. For live minnow bait the mean or relaxed diameter may be about three-eighths of one inch and the length of the body portion about two inches; the tapered portion or "cone" may be as much as two inches in length in a good design. The cables are all bound together at the apex, but two or more of the strands may be spread beyond the tie to form an eye or loop.

This loop can be used to hitch the pulling end of the sock to a fishing line or hook device.

The invention comprising a "sock" of the kind just described and a unique form of fishing hook will now be further disclosed by reference to the following description taken in conjunction with the accompanying drawings wherein:

Fig. 1 is an elevation of a fishing lure comprising a sock cooperating with a hook of unique construction.

Fig. 2 is a plan view of the construction depicted in Fig. 1.

Fig. 3 is a fishing hook especially designed to make efficient use of a live bait.

Fig. 4 depicts a sock according to the invention.

Fig. 5 depicts a clip for supporting the sock upon a hook in the manner of my invention.

Fig. 6 is a view of the clip of Fig. 5 showing its form when folded into its utilitarian form.

Fig. 7 is a section along the line 7—7 of Fig. 2.

Fig. 8 is a side view of a modified form of the invention.

The sock or so-called "Chinese pull" is shown as comprising an open mesh body 6 generally cylindrical in shape and made up of two groups of flexible elements 4 helically extending in opposite directions and interlaced to form a wide mesh. The flexible elements 4 are wire strands as previously mentioned, but could be of other material according to dictates of manufacture. The wire strands are returned at the mouth end 5 of the sock so that one strand is continuous with an adjacent strand. One of said groups of strands stems from a cable 2 at the closed tapered end 7, and the other group stems from a co-extensive strand 3 at that end, and at this end the cables 2 and 3 are clipped or otherwise permanently fastened together, as will be described later. The outer ends of the cables are integrated or otherwise joined.

Any suitable number of strands may be used in weaving the body of the sock, for example there may be eight or more. The more strands in the weave, the better the shape of the configuration, but too many strands tend to over-enclose the bait so that its "aura" or scent is not so readily detected by the game. Four strands have been illustrated to make the construction easier to visualize but preferably not more than eight strands would be used in practice. When a bait such as a live minnow is inserted at the mouth 5, into the body 6, it is restrained by the woven configuration but is not hurt or prevented from "breathing" so that it remains alive while submerged and inside the cage of the sock. The tapered portion 7 cooperates with the wires 2, 3 so that any attempt by the fish to back out of the cage is frustrated since its struggles only lengthen the meshes of 7 causing 6 to contract and hold the bait firmly. If a game fish grasps the sock and pulls upon the mesh at the body portion, the angler pulls in the opposite direction upon the cables 2, 3 and the game cannot remove the bait.

The sock and its live bait do not of course "catch" the game, they are the lure by which the game fish is beguiled.

According to my teachings the sock is attached to a hook of special design. The hook per se includes a bill 8, a barb 9 and stem 10; the distal end of the stem terminates in a resilient coupling 11 whereby it is joined at an angle of approximately 90 degrees to a shank 12 whose distal end terminates in a line eye 13. As a practical expedient the shank 12, stem 10 and coupling 11 are all of one piece of solid wire, the coupling 11 being in the form of a loop in the wire.

The wires 2, 3 form a pull for the sock and may be "half-hitched" to the loop 11 in the manner shown in Figs. 1 and 2. In order to make the sock lie in parallel attitude with the stem of the fish hook, I provide a clip 14 of pliant metal comprising a rolled eye 15 and an integral tab 16. Said eye 15 is clipped on cables 2, 3 near the closed end of the sock. The sock is arranged in parallel relation with the stem 10 of the hook. The cables 2, 3 form a pull which is hitched to the loop 11. The tab 16 is bent over, as in Fig. 6, to grasp the stem 10 as shown in Figs. 1, 2 and 7. The live bait 17 is inserted in the sock and the device is ready to be cast into the water, being, of course, fastened to an appropriate fishing line attached to the shank at 13.

The specially designed fishing hook has a nice balance in the water. If the portion 12 is made about four times as long as the stem 10, the assembly will adopt a tilted attitude when in the water giving the appearance of a minnow swimming upwardly therein. When the game strikes, it is caught upon the bill 8 and the initial strain upon the line 10 is relieved by the resilience of the loop 11: this relief does not, however, affect the firmness with which the bait 17 is held. The game fish cannot obtain bait 17 except by swallowing both hook and bait whereupon chances of escape are very small indeed.

Another feature of the fish hook of Figure 3 resides in its behavior when the game strikes. Not only is it resilient at 11, but when the game recoils after the strike, the whole assembly tends to whirl about the eye 13 thereby confusing the game by causing it to loose a sense of the direction of pull of the line. In that brief interval of uncertainty, the angler is given time to organize his strategy for subsequent "playing" of the game.

It is possible to attach several socks to one line and the hook may be, for example, a double-stemmed affair with a common shank 12 and two or more stems 10 radiating angularly from the flexible coupling 11.

A slightly modified form of the invention is depicted in Fig. 8 which comprises a shank 120 vertically arranged and having an eye at its upper end for connection to the line 18. The lower end is supplied with two oppositely arranged stems 100 and 101, which are horizontally arranged and integral with or secured to part 120, as by brazing. These stems terminate in hooks 102 and 103, and the stem 100 is shorter than the stem 101. A sock, indicated at 104, is secured at its closed end to each of the stems 100 and 101 as by a clip 105 and arranged to extend alongside of the respective hook.

This modified form of the invention is most desirable for still fishing in a stream and it is used by placing live minnows in the socks 104 with one of the minnows facing away from the shank 120 and captive in the sock belonging to the short stem 100. The other minnow is faced toward the shank 120 and made captive in the sock belonging to the long stem. Accordingly, in fishing in a stream of water in which the current is normally moderate the minnows are maintained in a general upstream direction by reason of the difference in lengths of the stems 100 and 101, which produces a balancing arrangement.

The above and other modifications falling within the broad spirit of my invention will occur to those skilled in the art. All such are to be regarded as lying within the ambit of the appended claim.

What I claim is:

In a fish lure including a hook and a live bait-receiving and retaining open mesh sock having a strand form attaching cable at one end, said sock comprising an open mesh of flexible strands extending helically in a crossed and interlaced manner whereby said body is constituted of an open mesh adapted to be elongated with an attendant reduction in girth, said body having an open end and a closed end, the closed end being of a conical shape and said strands of the body being arranged in two groups with strands of each group at said open end interconnected by a return bend, strands of said two groups being extended away from said closed end axially of said body to provide said attachment cable, said hook comprising a substantially L-form functionally integral stem of stiff but somewhat resilient material and providing continuous and unobstructed long and short arms, the free end of the former terminating in a line-attaching portion and the free end of the latter terminating in a barb-incorporating hook, said stem at the junction of said arms being bent to provide an arm-connecting coil spring-providing loop at one side and extending away from the axis of the short arm in the same direction as said hook, whereby the arms are resiliently connected for relative movement only in the plane of said stem, means connecting the sock-attaching cable to said spring-providing loop so that the sock can be extended rearwardly to lie alongside said short stem arm and hook bill, and a clip of pliant material comprising an eye and an integral laterally extending tab, the sock-attaching member slidably threaded through said clip eye and tab bent to frictionally embrace a selected portion of said short stem arm so as to secure the adjacent sock end in variable proximity to the hook-providing stem arm.

References Cited in the file of this patent

UNITED STATES PATENTS

| | | |
|---|---|---|
| 862,150 | Fredricks | Aug. 6, 1907 |
| 1,802,657 | Kellems | Apr. 28, 1931 |
| 1,993,582 | Anderson | Mar. 5, 1935 |
| 2,164,278 | Kellems | June 27, 1939 |
| 2,274,131 | Edberg | Feb. 24, 1942 |
| 2,592,664 | De Mello | Apr. 15, 1952 |